United States Patent Office 3,772,298
Patented Nov. 13, 1973

3,772,298
1-(1,2-DIPHENYL - 2 - FORMYLVINYL)-4-METHYL-PIPERAZINE AND SALTS THEREOF WITH PHYSIOLOGICALLY TOLERATED ACIDS
Wilhelm Bartmann, Neuenhain, Taunus, and Hans-Georg Alpermann, Kelkheim, Taunus, Germany, assignors to Farbwerke Hoechst Aktiengesellschaft vormals Meister Lucius & Brüning, Frankfurt am Main, Germany
No Drawing. Filed Dec. 21, 1971, Ser. No. 210,614
Claims priority, application Germany, Dec. 23, 1970, P 20 63 384.5
Int. Cl. C07d 51/70
U.S. Cl. 260—268 R                    3 Claims

ABSTRACT OF THE DISCLOSURE

Analgesically active 1-(1,2-diphenyl-2-formylvinyl)-4-methylpiperazine,

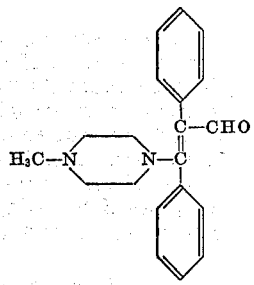

and acid addition salts thereof with physiologically tolerated acids.

Method for preparing these compounds.

---

The present invention relates to 1-(1,2-diphenyl-2-formylvinyl) - 4 - methyl-piperazine having an analgesic action and corresponding to the Formula I

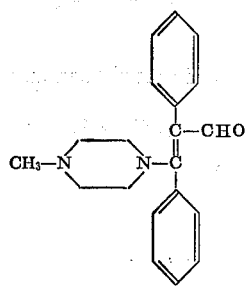

(I)

and its addition compounds with physiologically tolerated acids.

Furthermore the present invention relates to a process for preparing the piperazine derivative of the Formula I, wherein compounds of the Formula II

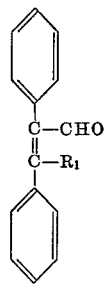

(II)

wherein $R_1$ represents bromine or chlorine, are reacted in non-aqueous solvents with 1 to 3 molar equivalents of an anhydrous N-methyl-piperazine and the compound obtained is optionally converted with physiologically tolerated acids into thereof. [The reaction of β-chlorovinyl aldehydes with secondary amines to obtain the corresponding β-aminovinyl aldehydes is known from Z. Arnold et al., Collection Czechoslovak Chemical Communications, 24, 2385 (1959)].

As non-aqueous solvents, there may be used, for example, ethanol, acetonitrile, dimethylformamide, dimethyl sulfoxide, preferably aprotic solvents such as anhydrous benzene, toluene or xylene. The reaction is carried out at temperatures between 20° C. and 140° C. during a period of time of between 2 hours and several days, preferably by heating for 3 to 6 hours to 80°–120° C. The operation can also be carried out in an inert gas atmosphere, optionally in the presence of a tertiary amine, for example triethylamine.

The compound of the Formula I of the invention which contains both a carbonyl and an enamine function in the molecule is distinguished by a surprising stability which was not forseeable for this class of compounds. For example, the compound of the invention can be precipitated in unchanged form from an acetic acid solution by addition of alkali, whereas enamines ara in general cleaved in the presence of water by catalytic amounts of organic acids. The compound of the invention forms crystalline salts with a number of di-basic organic acids such as fumaric acid, oxalic acid or succinic acid. Even with methanesulfonic acid or with 2 N-sulfuric acid, stable crystallized salts can be obtained with very good yields.

The compound of the present invention and its physiologically tolerated salts are distinguished by valuable analgesic properties. The sulfuric acid salt of the compound of the Formula I was compared with Pyramidon in the following tests:

Test No. 1: Heat pain test on the mouse ("Brennstrahlmethode" (radiant heat method) according to L. Ther, E. Lindner, G. Vogel described in "Zur pharmakodynmischen Wirkung der optischen Isomeren des Metadons" in D. Apoth. Ztg. 103, page 514–520, 1963, according to which a light beam is directed on the upper proximal part of a mouse's tail and the time until reaction occurs is measured.)

Test No. 2: Hot plate test on a mouse (copper plate 56° C.) according to G Woolfe and A. D. McDonald, J. Pharmacolog. Exp. Ther. 80, 300 (1944).

Test No. 3: Electric excitation over tail electrodes on the rat (test according to R. S. Grewal, Brit. J. Pharmacolog. 7, 433 (1952).

The following values were obtained:

| | Test 1 (radiant heat) | Test 2 (hot plate) | Test 3 (electrical excitation) | Acute toxicity, $LD_{50}$ i.v. mouse, mg./kg. |
|---|---|---|---|---|
| 1-(1,2-diphenyl-2-formylvinyl)-4-methyl-piperazinehydrogenosulfate. | $ED_{50}$, 51 mg./kg. s.c. | $ED_{50}$, 55 mg./kg. s.c. | $ED_{50}$, 22 mg./kg. s.c. | 72 |
| Pyramidon | $ED_{50}$, 110 mg./kg. s.c. | $ED_{50}$, 230 mg./kg. s.c. | $ED_{50}$, could not be determined | 150 |

It can be seen from the above dates that the compound of the invention is clearly superior to Pyramidon with regard to its analyesic properties.

The compounds of the invention may be used in pharmaceutical preparations having an analgesic action, in admixture with the usual pharmaceutical usual carriers, solvents and excipients.

For oral administration, powders, tablets, dragées or capsules are used which contain the analgesic agent in a dosage between 0.05 and 0.5 g., preferably between 0.1 and 0.3 g., per single dose, in admixture with carriers such as lactose, starch, talc and similar carriers.

For parenteral administration, the compounds of the invention are suitably used in isotonic solutions.

The compounds of the invention with analgesic action may furthermore be used in combination with other drugs. As such, there may be used, in addition to other analgesic agents, for example antipyretic agents such as acetyl-salicylic acid, N-acetyl-p-aminophenol, phenacetin, pyrazolone derivatives, ethoxybenzamide or purine derivatives such as caffeine.

The following examples illustrate the invention:

EXAMPLE 1a 1-(1,2-diphenyl-2-formylvinyl)-4-methylpiperazine 73 g. (0.3 mole) of 3-chloro-2,3-diphenyl-acryl-aldehyde (prepared according to M. Weissenfels and co-workers, Z. Chem. 6, 472 (1966)), were boiled with 60 g. (0.6 mole) of N-methylpiperazine in 500 ml. of anhydrous benzene for 4 hours under reflux. The reaction product was then allowed to stand for 72 hours at room temperature, washed twice with about 200 ml. of 2N—NaOH and water and the solvent was removed by distillation under reduced pressure. The residue was dissolved at the boiling temperature in about 300 ml. of diisopropyl ether by addition of ethyl acetate. Upon cooling, 73 g. of thin-layer chromatographically uniform crystals melting at 142° (80% of the theory) crystallized.

EXAMPLE 1b

In the same manner, 60.3 g. of crystals melting at 142° C. (65% of theory) were obtained from 86.5 g. (0.3 mole) of 2-bromo-1,2-diphenylacryl-aldehyde by reaction with (0.6 mole) of N-methylpiperazine.

The 2-bromo-1,2-diphenyl-acrylaldehyde was obtained according to M. Weissenfels and co-workers, Z. Chem. 6, page 472 (1966) from dimethylformamide, phosphorus tribromide and desoxybenzoin in trichloroethylene. Melting point 166° C.

EXAMPLE 2

1-(1,2-diphenyl-2-formylvinyl)-4-methyl-piperazinemethane-sulfate 9.3 g. of 1-(1,2-diphenyl-2-formylvinyl)-4-methylpiperazine and 2.9 g. of methane-sulfonic acid were dissolved in methanol, whereupon 12 g. of the methane-sulfonate melting at 203° C. were obtained by precipitation with diethyl ether. The salt was clearly soluble in water and was not hydrolyzed after standing for 3 days.

EXAMPLE 3

In analogous manner, there was obtained the 1-(1,2-diphenyl - 2 - formylvinyl) - 4-methylpiperazinesuccinate; melting point 136° C.

EXAMPLE 4

In analogous manner there was obtained the 1-(1,2-diphenyl-2-formylvinyl)-4-methylpiperazinefumarate; melting point 152° C.

EXAMPLE 5

1-(1,2-diphenyl-2-formylvinyl)-4-methyl-piperazinebisulfate 15.3 g. (0.05 mole) of 1-(1,2-diphenyl-2-formylvinyl)-4-methylpiperazine were dissolved in 150 ml. of $CHCl_3$. 49 ml. of $2N—H_2SO_4$ were added dropwise, while stirring. After stirring for about 1 hour, the solution solidified to a crystal magma, which was filtered off with suction and washed successively with chloroform, diisopropyl ether and a small amount of cold methanol. After drying, 15 g. of the hydrogenosulfate having a decomposition point of above 210° C. were obtained.

We claim:
1. 1 - (1,2-diphenyl-2-formylvinyl)-4-methylpiperazine and its salts with physiologically tolerated acids.
2. 1 - (1,2-diphenyl-2-formylvinyl)-4-methylpiperazine-methane sulfonate.
3. 1 - (1,2-diphenyl-2-formylvinyl)-4-methylpiperazine-bisulfate.

References Cited

UNITED STATES PATENTS

| 3,188,315 | 6/1965 | Villani | 260—268 R |
| 3,600,391 | 8/1971 | Mastursi | 260—268 T R |
| 3,647,863 | 3/1972 | Palopoli | 260—268 R |
| 3,655,654 | 4/1972 | Kitamura | 260—240 D |

OTHER REFERENCES

Arnold et al., Coll. Szech. Chem. Commun., vol. 24, pp. 2385–92 (1959).

DONALD G. DAUS, Primary Examiner

U.S. Cl. X.R.

260—599; 424—258